US011887569B2

(12) United States Patent
Torimura et al.

(10) Patent No.: US 11,887,569 B2
(45) Date of Patent: Jan. 30, 2024

(54) PERFORMANCE SYSTEM, PERFORMANCE MODE SETTING METHOD, AND PERFORMANCE MODE SETTING DEVICE

(71) Applicant: Yamaha Corporation, Hamamatsu (JP)

(72) Inventors: Hiroyuki Torimura, Hamamatsu (JP); Tsuyoshi Maruyama, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 495 days.

(21) Appl. No.: 17/205,256

(22) Filed: Mar. 18, 2021

(65) Prior Publication Data

US 2021/0201870 A1 Jul. 1, 2021

Related U.S. Application Data

(63) Continuation of application No. PCT/JP2019/040099, filed on Oct. 10, 2019.

(30) Foreign Application Priority Data

Jan. 22, 2019 (JP) ................................ 2019-008777

(51) Int. Cl.

| | |
|---|---|
| ***G10H 1/18*** | (2006.01) |
| ***G10H 1/00*** | (2006.01) |
| ***G10H 1/34*** | (2006.01) |

(52) U.S. Cl.

CPC ........... *G10H 1/182* (2013.01); *G10H 1/0008* (2013.01); *G10H 1/344* (2013.01); *G10H 2220/101* (2013.01); *G10H 2220/221* (2013.01)

(58) Field of Classification Search

CPC ...... G10H 1/182; G10H 1/0008; G10H 1/344; G10H 2220/101; G10H 2220/221

(Continued)

(56) References Cited

U.S. PATENT DOCUMENTS

2002/0166437 A1* 11/2002 Nishitani ............ G10H 1/0008 84/600
2006/0130641 A1* 6/2006 Kurahashi ............... G10H 1/18 84/742

(Continued)

FOREIGN PATENT DOCUMENTS

CN 101276581 B * 7/2012 ............ G09B 15/00
CN 107481581 A * 12/2017 .......... G06F 3/0481

(Continued)

OTHER PUBLICATIONS

English translation of International Search Report issued in Intl. Appln. No. PCT/JP2019/040099 dated Dec. 10, 2019, previously cited in IDS filed Mar. 18, 2021.

(Continued)

*Primary Examiner* — Christina M Schreiber
(74) *Attorney, Agent, or Firm* — ROSSI, KIMMS & McDOWELL LLP

(57) ABSTRACT

A performance system can include a primary unit and a secondary unit. The secondary unit is provided for an electronic musical instrument that can be set to a first mode that enables performance by a single individual and a second mode that enables performance by a plurality of individuals, has connecting portions enabling connection of one or a plurality of receivers having at least a receiving function, and is able to communicate with the primary unit. The performance can also include an determining portion for determining whether or not a plurality of the receivers is connected to the connecting portion, and a transmitting portion for transmitting, to the primary unit, a notification that the second mode has been set, upon determining that a plurality of the receivers has been connected to the connecting portion. The secondary unit can include a setting portion for setting the electronic musical instrument to the second (Continued)

mode upon a determination that a plurality of receivers has been connected to the connecting portion.

15 Claims, 8 Drawing Sheets

(58) Field of Classification Search
USPC .......................................................... 84/617
See application file for complete search history.

(56) References Cited

U.S. PATENT DOCUMENTS

| | | | | |
|---|---|---|---|---|
| 2008/0028916 | A1* | 2/2008 | Shimizu | G09B 15/00<br>84/477 R |
| 2009/0031884 | A1* | 2/2009 | Arai | G09B 15/002<br>84/609 |
| 2013/0220103 | A1* | 8/2013 | Maruyama | G10H 1/18<br>84/615 |
| 2021/0201864 | A1* | 7/2021 | Yokoyama | H04W 56/001 |
| 2021/0201866 | A1* | 7/2021 | Yokoyama | G10H 1/0008 |
| 2021/0201870 | A1* | 7/2021 | Torimura | G10H 1/344 |

FOREIGN PATENT DOCUMENTS

| | | | | | |
|---|---|---|---|---|---|
| EP | 1975920 | B1 | * | 12/2014 | G09B 15/00 |
| JP | S54042769 | Y2 | | 12/1979 | |
| JP | H03-213894 | | | 9/1991 | |
| JP | H03213894 | A | * | 9/1991 | |
| JP | 2000020063 | A | | 1/2000 | |
| JP | 3371503 | B2 | | 1/2003 | |
| JP | 2006-163119 | | | 6/2006 | |
| JP | 2008-276187 | | | 11/2008 | |
| JP | 2009-223255 | | | 10/2009 | |
| JP | 2009-223256 | | | 10/2009 | |
| JP | 2009223255 | A | * | 10/2009 | |
| JP | 4904971 | B2 | | 3/2012 | |
| JP | 2013-174771 | | | 9/2013 | |
| JP | 2016173599 | A | | 9/2016 | |
| JP | 2018112724 | A | | 7/2018 | |
| JP | 2018112725 | A | | 7/2018 | |

OTHER PUBLICATIONS

Written Opinion issued in Intl. Appln. No. PCT/JP2019/040099 dated Dec. 10, 2019. English translation provided.
"Yamaha LC4 Music Lab Installation Guide" Yamaha Corporation of America. 2015: pp. 1-8.
Office Action issued in Japanese Appln. No. 2019-008777 dated Feb. 7, 2023. English machine translation provided.
Office Action issued in Japanese Appln No. 2019-008777 dated Sep. 6, 2022. English machine translation provided.
International Search Report for PCT Application No. PCT/JP2019/040099, dated Dec. 10, 2019 in 4 pages.
Office Action issued in Chinese Appln. No. 201980087918.5, dated Sep. 1, 2023. English machine translation provided.

* cited by examiner

PERFORMANCE SYSTEM, PERFORMANCE MODE SETTING METHOD, AND PERFORMANCE MODE SETTING DEVICE

FIELD OF TECHNOLOGY

The present inventions relate to performance systems, performance mode setting methods, and performance mode setting devices.

DESCRIPTION OF THE RELATED ART

There are electronic musical instrument systems in which an electronic musical instrument that serves as a primary unit is connected by a cable, or the like, to another electronic musical instrument that serves as a secondary unit. For example, Japanese Unexamined Patent Application Publication H3-213894 ("JP '894") describes such an electronic musical instrument system, in which one or more students receive performance instruction using respective secondary units, and where an instructor, with a primary unit, detects the state of performance of each of the secondary units. In such an electronic musical instrument system, the keyboards of the secondary units may be divided into two key regions, enabling two or more individuals to perform on a single secondary unit.

SUMMARY OF THE INVENTIONS

Problem Solved by the Present Inventions

In the electronic musical instruments described in JP '894, the instruments can be switched between a normal mode and a split mode through operation of a mode switch. With the mode switch in a split mode position, two performers are each able to perform on two respective key regions of a keyboard. In this way, with the electronic musical instrument of JP '894, when two performers are performing in split mode, it is necessary for one performer to operate the mode switch to switch the keyboard into the split mode. If a performance has started despite the two performers having forgotten to operate the mode switch, the performance will be on a keyboard that is in normal mode, rather than being divided into the two key regions. In such a case, it is necessary to then operate the mode switch and restart the performance.

An object of at least one of the present inventions is to provide a performance system, a performance mode setting method, and a performance mode setting device wherein a performance by a plurality of performers on an electronic musical instrument can be started smoothly.

Means for Solving the Problem

A performance system according to an embodiment comprises: a primary unit; a secondary unit that is provided for an electronic musical instrument that can be set to a first mode that enables performance by a single individual and a second mode that enables performance by a plurality of individuals, said secondary unit having connecting portions enabling connection of one or a plurality of receivers having at least a receiving function, where said secondary unit is able to communicate with the primary unit; a determining portion for evaluating whether or not a plurality of the aforementioned receivers is connected to the connecting portion; and a transmitting portion for transmitting, to the primary unit, a notification that the second mode has been set, upon evaluation that a plurality of the aforementioned receivers has been connected to the connecting portion, wherein: the secondary unit includes a setting portion for setting the electronic musical instrument to the second mode upon an evaluation that a plurality of aforementioned receivers has been connected to the connecting portion.

The electronic musical instrument may be a keyboard musical instrument that has a keyboard, and the setting portion, in the second mode, may divide the keyboard into a plurality of key regions corresponding to a plurality of individuals.

The primary unit may have a display unit or may be connectable to a display unit, and the primary unit may comprise a receiving portion for receiving a notification, transmitted by the transmitting portion, that the second mode has been set, and a display controlling portion for displaying, on the display unit, a display indicating the second mode, upon receipt of the notification that the second mode has been set.

Upon evaluation, by the determining portion, that a single receiver has been connected to the connecting portion, the transmitting portion may transmit, to the primary unit, notification that the first mode has been set, the receiving portion may receive notification from the transmitting portion that the first mode has been set and the display controlling portion, upon reception of notification that the first mode has been set, may display, on the display unit, a first image that corresponds to the first mode, and, upon reception of notification that the second mode has been set, may display, on the display unit, a second image corresponding to the second mode.

The first image may include a first icon representing a single individual, and the second image may include a second icon indicating a plurality of individuals.

The primary unit may be able to communicate with a plurality of aforementioned secondary units, and the display controlling portion may display, on the display unit, aforementioned first or second images in correspondence with the plurality of secondary units.

If the second mode is set, the transmitting portion may transmit, to the primary unit, data that is produced based on the actions of each of a plurality of individuals, and also transmit, to the primary unit, identifying information for identifying the source that produced the transmitted data.

A performance mode setting method according to another embodiment is a performance mode setting method that is achieved through a computer, including: evaluating whether or not a plurality of receivers, having at least a receiving function, are connected to a secondary unit that is provided for an electronic musical instrument that can be set to a first mode that enables performance by a single individual and a second mode that enables performance by a plurality of individuals; setting the electronic musical instruments to the second mode upon evaluation that a plurality of aforementioned receivers are connected to the secondary unit; and transmitting, from the secondary unit to a primary unit, a notification that the second mode has been set, upon evaluation that a plurality of aforementioned receivers have been connected to the secondary unit.

The electronic musical instrument may be a keyboard musical instrument that has a keyboard, and setting to the second mode may include dividing the keyboard into a plurality of key regions corresponding to a plurality of individuals in the second mode.

The primary unit may have a display unit or may be connectable to a display unit, and a notification, transmitted by the transmitting portion, that the second mode has been set may be received by the primary unit, and a display indicating the second mode, upon receipt of the notification that the second mode has been set may be displayed on the display unit.

The mode setting method may further include: transmitting, from the secondary unit to a primary unit, a notification that the first mode has been set, upon evaluation that a single aforementioned receivers has been connected to the secondary unit; upon reception, by the primary unit, of notification that the first mode has been set, a first image that corresponds to the first mode is displayed, and, upon reception of notification that the second mode has been set, displays on the display unit, as a display displaying the second mode on the display unit, a second image corresponding to the second mode.

The first image may include a first icon representing a single individual, and the second image may include a second icon indicating a plurality of individuals.

The performance mode setting method may include displaying, on the display unit, first or second images corresponding to a plurality of secondary units.

The performance mode setting method may further include, the transmitting portion transmitting, to the primary unit, data that is produced based on the actions of each of a plurality of individuals, and also transmit, to the primary unit, identifying information for identifying the source that produced the transmitted data, if the second mode is set.

A performance mode setting device according to another embodiment comprises: a connecting portion, enabling connection of one or a plurality of receivers having at least a receiving function, provided in an electronic musical instrument that can be set to a first mode that enables performance by a single individual and a second mode that enables performance by a plurality of individuals; a determining portion for evaluating whether or not a plurality of the aforementioned receivers is connected to the connecting portion; and a setting portion for setting the electronic musical instrument to the second mode upon an evaluation that a plurality of aforementioned receivers has been connected to the connecting portion.

The above embodiments can provide an advantage in that a performance by a plurality of individuals on an electronic musical instrument can be started smoothly.

BRIEF DESCRIPTIONS OF THE DRAWINGS

DETAILED DESCRIPTION OF PREFERRED EMBODIMENTS

A performance system and a performance mode setting method according to an embodiment will be explained below with reference to the drawings.

Configuration of the Performance System

Figure 1:
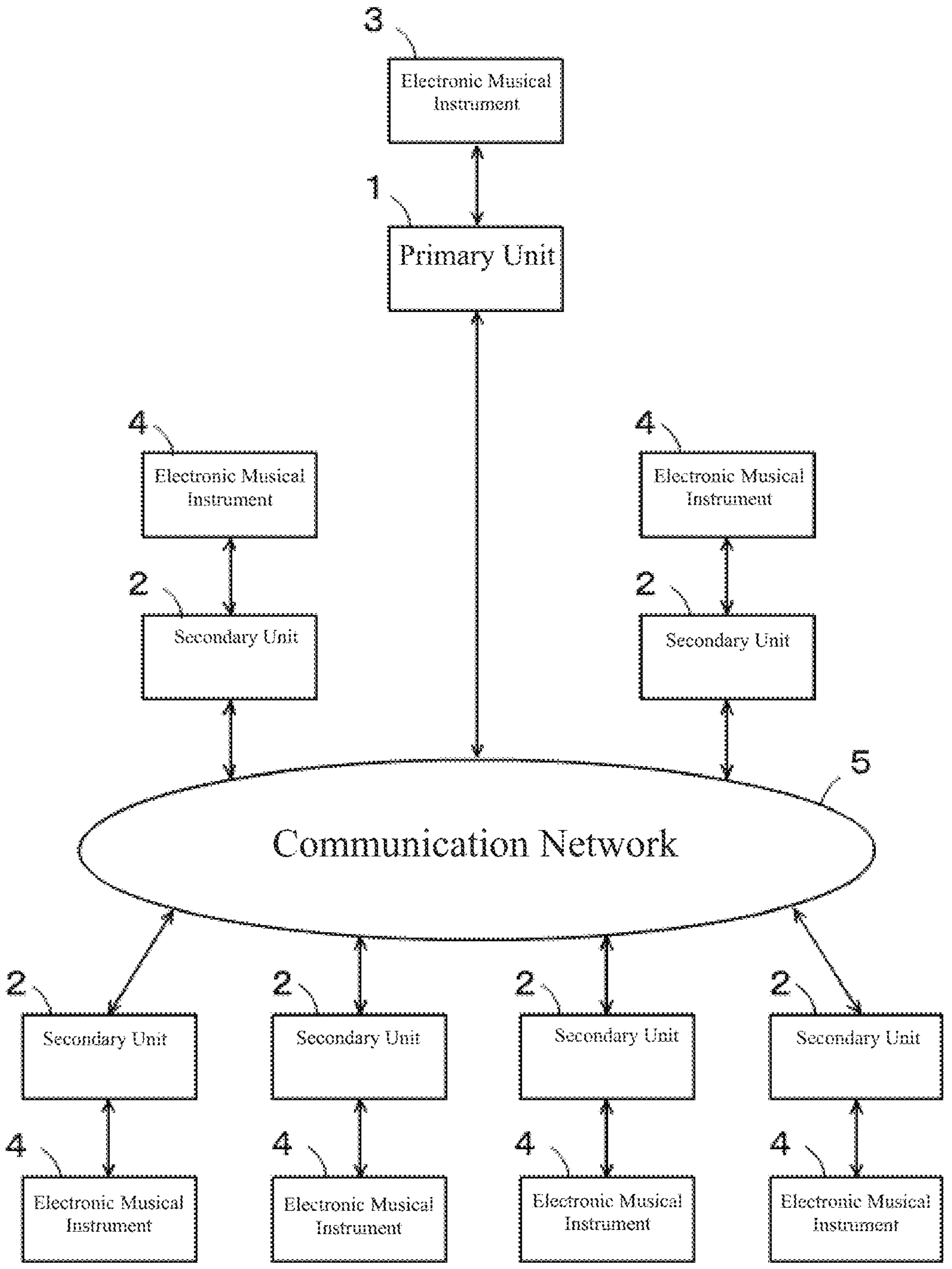
FIG. 1 is a block diagram depicting a configuration for a performance system according to one embodiment.

FIG. 1 is a block diagram depicting the configuration of a performance system according to one embodiment. The performance system according to the present embodiment is a performance training system.

The performance system of FIG. 1 includes a primary unit 1 and a plurality of secondary units 2. The primary unit 1 is connected to an electronic musical instrument 3 used by a teacher (a trainer or an instructor), and is connected to a communication network 5 such as a LAN (Local Area Network), or the like. Each secondary unit 2 is connected to an electronic musical instrument 4 for a student (a trainee or recipient of instruction). Each secondary unit 2 is connected to an electronic musical instrument 4 for the student (the trainee or recipient of instruction), and is also connected to the communication network 5. One or more headsets, as described below, can be connected to each primary unit 1 and secondary unit 2. Each secondary unit 2 is assigned a secondary unit identifier for identifying that secondary unit 2 from among the other secondary units 2.

The electronic musical instruments 3 and 4 are electronic keyboard musical instruments such as, for example, electronic pianos, or the like. Each electronic musical instrument 3 and 4 includes, primarily, a performance operating element such as a keyboard, or the like, a setting operating element such as a plurality of switches, or the like, a display unit, a sound source, an acoustic effects portion, a sound system, a CPU (central processing unit), a RAM (Random Access Memory), a ROM (Read-Only Memory), a communication I/F (interface), and a storage device.

During performance training, each secondary unit 2 transmits, to the primary unit 1 or to other secondary units 2, performance data indicating the performance on an electronic musical instrument 4 by a student, and transmits, to the primary unit 1 or to other secondary units 2, voice data indicating the voice of the student. The primary unit 1 sends, to each secondary unit 2, performance data indicating the performance by the teacher on the electronic musical instrument 3, and also transmits, to each secondary unit 2, voice data indicating the voice of the teacher.

Each secondary unit 2 can selectively set the performance mode for the electronic musical instrument 4 to solo mode (the normal performance mode) or duo mode. In solo mode, a single performer is able to perform using the entirety of the keyboard in a state wherein the keyboard is not divided into a plurality of keyboard regions. In duo mode, the keyboard is divided into a left key region and a right key region at a splitting point, enabling two performers to perform using the respective left key region and right key region. Consequently, each secondary unit 2 is a performance mode setting device for setting the performance mode of the corresponding electronic musical instrument 4.

The primary unit 1 is able to receive, simultaneously or selectively, performance data through performances using the divided left key region and right key region of the electronic musical instrument 4 that has been set to duo mode. Moreover, the primary unit 1 is able to send and receive, simultaneously or selectively, the voice data of each of the two headsets that are connected to the secondary unit 2. In this case, the secondary unit 2 both transmits performance data or voice data to the primary unit 1 and also transmits, to the primary unit 1, identifying information for identifying the source that produced the performance data or voice data.

Structure of the Primary Unit 1 and the Secondary Units 2

Figure 2:
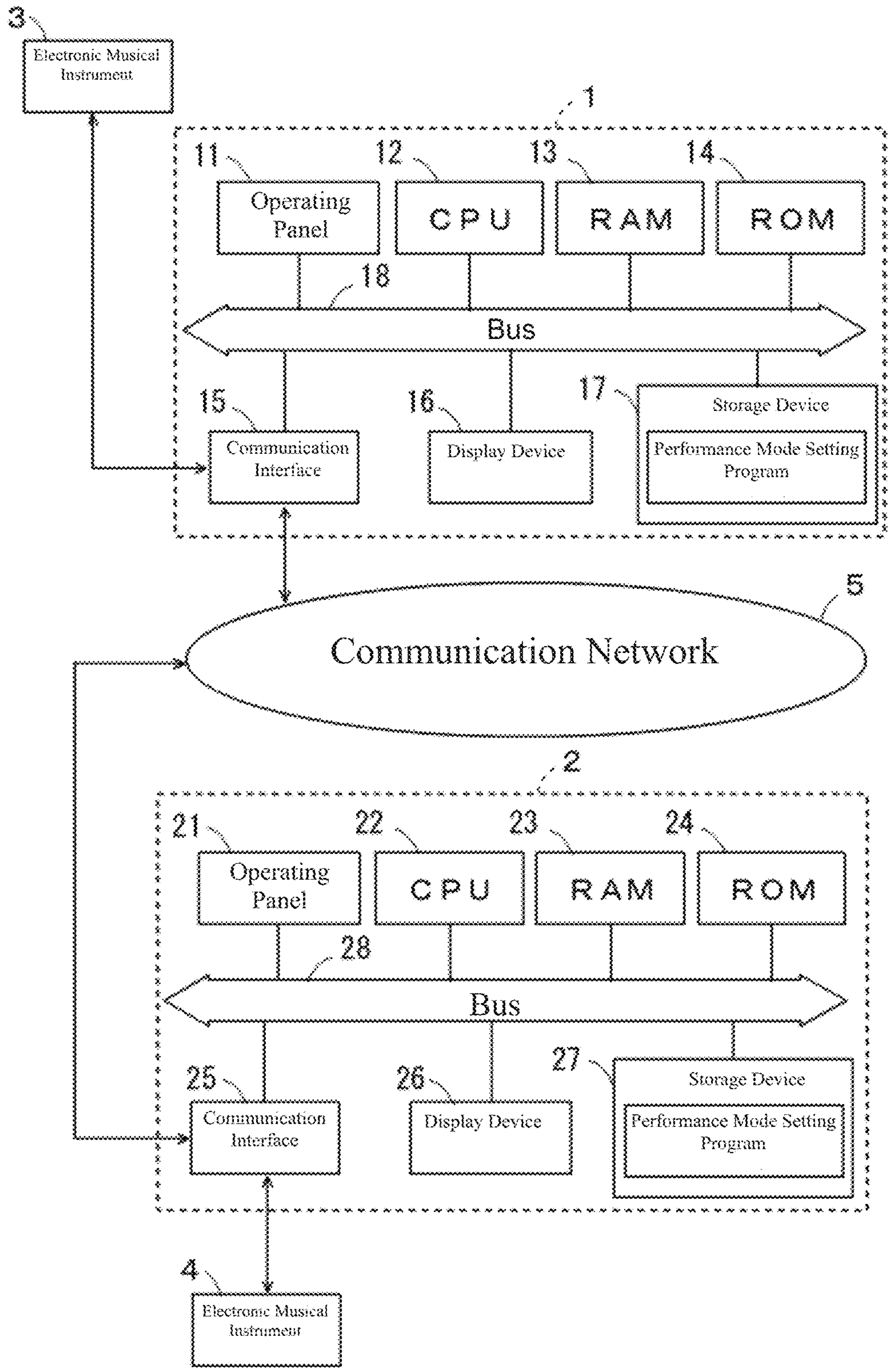
FIG. 2 is a block diagram depicting a configuration of a primary unit and secondary units.

FIG. 2 is a block diagram depicting the structure of the primary unit 1 and the secondary units 2. FIG. 2 shows the structure of only a single secondary unit 2.

The primary unit 1 includes an operating panel 11, a CPU 12, a RAM 13, a ROM 14, a communication interface 15, a display unit 16, a storage device 17, and a bus 18. The operating panel 11, the CPU 12, the RAM 13, the ROM 14, the communication interface 15, the display unit 16, and the storage device 17 are connected through the bus 18. The operating panel 11 includes a variety of operating switches, or the like. Moreover, the operating panel 11 has a connecting portion enabling connection of one or a plurality of headsets. The storage device 17 includes a storage medium such as a hard disk, an optical disk, a magnetic disk, a memory card, or the like. A computer program such as a performance mode setting program, or the like, is stored in the storage device 17.

The RAM 13 is made from, for example, volatile memory, and is used as a work area for the CPU 12, and also for storing various types of data temporarily. The ROM 14 is made from, for example, a non-volatile memory, and stores a control program. The ROM 14 may store a computer program, such as a performance mode setting program, or the like. The CPU 12 executes a performance mode setting method, described below, through executing the performance mode setting program that is stored in the storage device 17 or the ROM 14.

The communication interface 15 is connected to the electronic musical instrument 3 and the communication network 5, to carry out communication between the CPU 12 and the electronic musical instrument 3, and communication between the CPU 12 and the secondary units 2. The display unit 16 includes, for example, a liquid crystal display. A variety of information regarding the secondary unit 2 is displayed on the display unit 16. The display unit 16 may be a touch panel display. In this case, a portion of the operating panel 11 may be displayed on the display unit 16. The user is able to direct various types of operations through operating the display unit 16.

As with the primary unit 1, the secondary unit 2 includes an operating panel 21, a CPU 22, a RAM 23, a ROM 24, a communication interface 25, a display unit 26, a storage device 27, and a bus 28. The operating panel 21, the CPU 22, the RAM 23, the ROM 24, the communication interface 25, the display unit 26, and the storage device 27 are connected through the bus 28. The operating panel 21 includes a variety of operating switches, or the like. Moreover, the operating panel 21 has a connecting portion enabling connection of one or a plurality of headsets. The storage device 27 includes a storage medium such as a hard disk, an optical disk, a magnetic disk, a memory card, or the like. A computer program such as a performance mode setting program, or the like, is stored in the storage device 27.

The RAM 23 is made from, for example, volatile memory, and is used as a work area for the CPU 22, and also for storing various types of data temporarily. The ROM 24 is made from, for example, a non-volatile memory, and stores a control program. The ROM 24 may store a computer program, such as a performance mode setting program, or the like. The CPU 22 executes a performance mode setting method, described below, through executing the performance mode setting program that is stored in the storage device 27 or the ROM 24.

The communication interface 25 is connected to the electronic musical instrument 4 and the communication network 5, and configured to carry out communication between the CPU 22 and the electronic musical instrument 4, and communication between the CPU 22 and the primary unit 1. The display unit 26 includes, for example, a liquid crystal display. Various types of information is displayed on the display unit 26. The display unit 26 may be a touch panel display. In this case, a portion of the operating panel 21 may be displayed on the display unit 26. The user is able to direct various types of operations through operating the display unit 26.

The performance mode setting program may be provided in a form that is stored on a computer readable recording medium, and may be installed into the storage devices 17 and 27 and ROMs 14 and 24 of the primary unit 1 and the secondary units 2. Moreover, the performance mode setting program may be stored on an external storage device. Furthermore, a performance mode setting program that has been distributed from a server that is connected to the communication network may be installed into the storage devices 17 and 27 or ROMs 14 and 24.

Operating Panel

Figure 3:
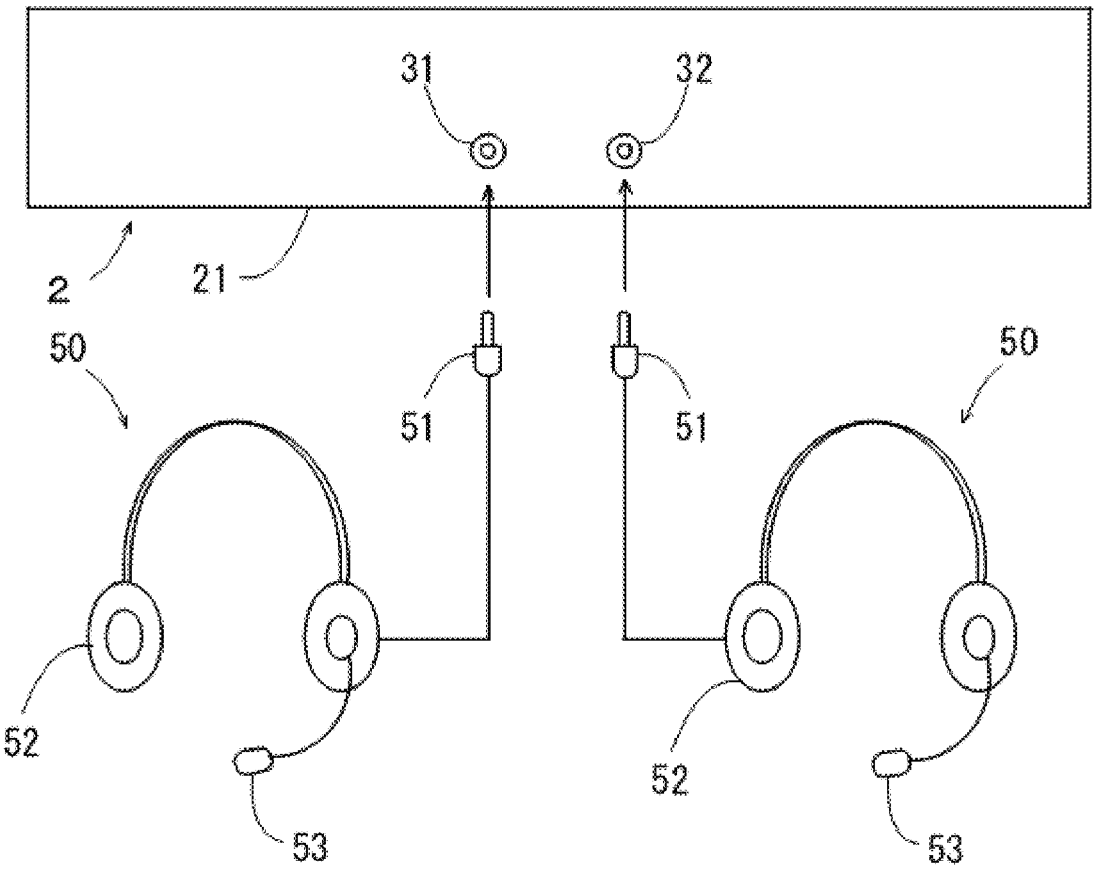
FIG. 3 is a schematic diagram depicting a portion of an operating panel for a secondary unit.

FIG. 3 is a schematic diagram depicting a portion of an operating panel 21 of a secondary unit 2. A first headset terminal 31 and a second headset terminal 32 are provided in the operating panel 21 of the secondary unit 2. Terminals 51 of headsets 50 can be inserted removably into the primary terminal 31 and the secondary terminal 32. This enables one or two headsets 50 to be connected to the secondary unit 2. Each headset 50 has a headphone 52 and a microphone 53. Each headset 50 is a receiver having a receiving function for receiving a sound signal generated from voice data or performance data transmitted from the primary unit 1. Each headset 50 also has a transmitting function for transmitting, to the secondary unit 2, a voice signal that is inputted through the microphone 53.

Functional Structure of the Primary Unit 1 and the Secondary Units 2

Figure 4:
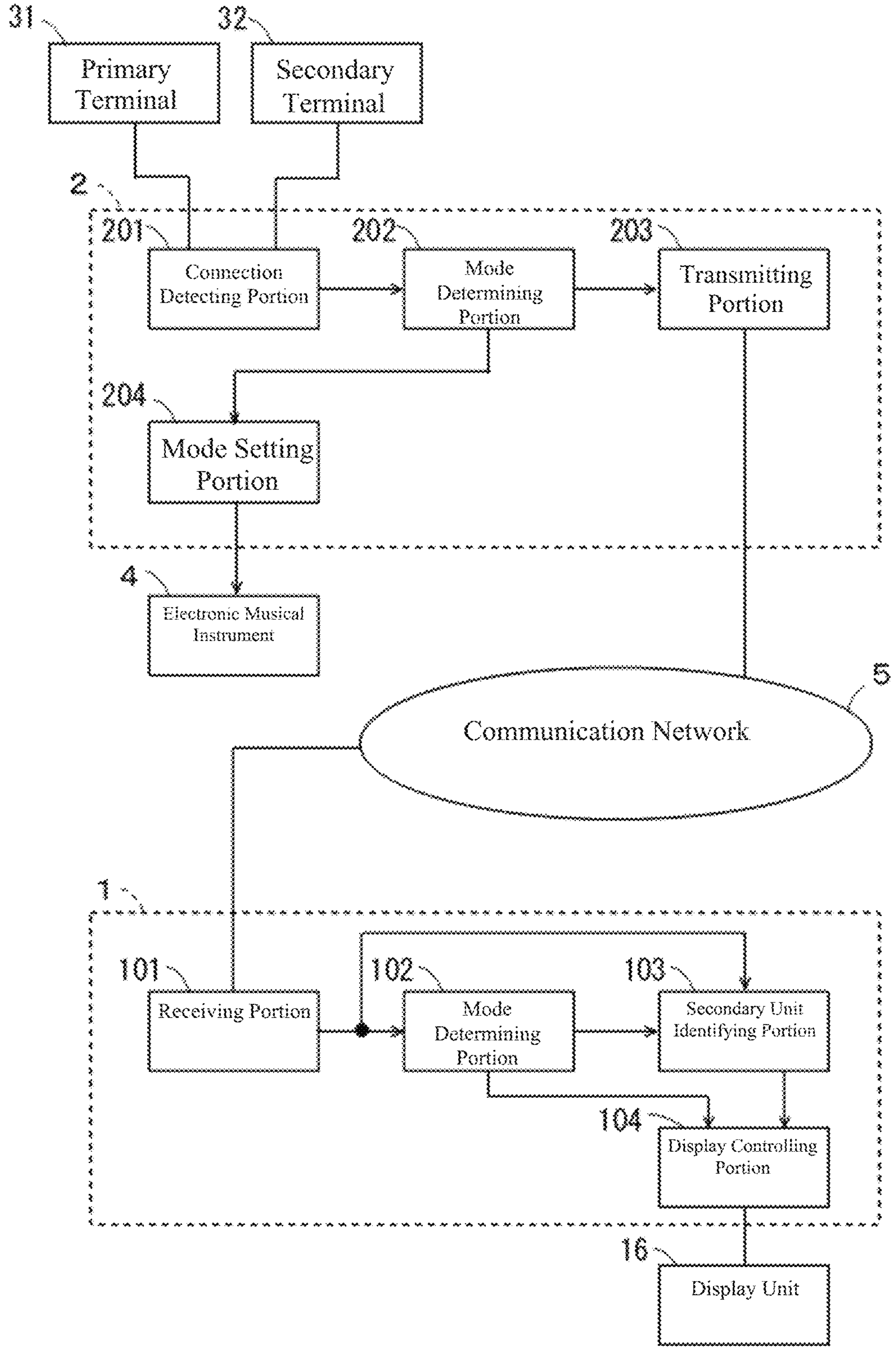
FIG. 4 is a block diagram depicting a functional structure for the primary unit and the secondary units.

FIG. 4 is a block diagram depicting the functional structure of the primary unit 1 and the secondary units 2. As illustrated in FIG. 4, a secondary unit 2 includes a connection detecting portion 201, a mode determining portion 202, a transmitting portion 203, and a mode setting portion 204. The functions of each of the structural parts (201 through 204) of the secondary unit 2 are achieved through execution, by the CPU 22 in FIG. 1, of the performance mode setting program that is stored in the storage device 27 or the ROM 24.

The connection detecting portion 201 can be configured to detect whether or not there is a headset 50 connected to the primary terminal 31 and/or the secondary terminal 32. The mode determining portion 202 can be configured to determine the performance mode based on the detection result by the connection detecting portion 201. For example, when a headset 50 is connected to the primary terminal 31 and no headset 50 is connected to the secondary terminal 32, the mode determining portion 202 can determine that the performance mode is the solo mode. Optionally, the mode determining portion 202 can determine the performance mode as being the solo mode if a headset 50 is connected to the secondary terminal 32 with no headset 50 connected to the primary terminal 31. On the other hand, if there are headsets 50 connected to both the primary terminal 31 and the secondary terminal 32, the mode determining portion 202 determines that the performance mode is the duo mode.

The transmitting portion 203 can be configured to send, to the primary unit 1 through the communication network 5, notification of the performance mode that has been determined by the mode determining portion 202. The notification of the performance mode can be a solo mode setting notification or duo mode setting notification. The solo mode setting notification and the duo mode setting notification include the secondary unit identifier that is assigned to the secondary unit 2. The performance mode notification is executed by sending and receiving performance mode notification data. Moreover, the transmitting portion 203 can also be configured to transmit, to the primary unit 1, voice data based on the sound signals inputted from each of the headsets 50, and performance data provided from the electronic musical instrument 4. The mode setting portion 204 can be configured to set the electronic musical instrument 4 to the performance mode that is determined by the mode determining portion 202.

The primary unit 1 comprises a receiving portion 101, a mode determining portion 102, a secondary unit identifying portion 103, and a display controlling portion 104. The functions of the various structural parts (101 through 104) of the primary unit 1 are achieved through execution, by the CPU 12 of FIG. 1, of the performance mode setting program stored in the storage device 17 or the ROM 14.

The receiving portion 101 can be configured to receive the performance mode notification (solo mode setting notification or duo mode setting notification) from the secondary unit 2 through the communication network 5. Moreover, the receiving portion 101 can also be configured to receive the voice data and performance data sent from the secondary unit 2. The mode determining portion 102 can be configured to determine the performance mode based on the performance mode notification received through the receiving portion 101. The secondary unit identifying portion 103 can be configured to identify the secondary unit 2 that sent the performance mode notification, based on the secondary unit identifier included in the performance mode notification received through the receiving portion 101.

The display controlling portion 104 can be configured to display, on the display unit 16, a display indicating the performance mode determined by the mode determining portion 202. For example, the display controlling portion 104 displays, on the display unit 16, a first image that corresponds to the solo mode or a second image that corresponds to the duo mode. The first image and second image are described below. If the electronic musical instrument 4 corresponding to a secondary unit 2 is used without either the solo mode or the duo mode being set, the display controlling portion 104 displays a third image on the display unit 16. In this case, the display controlling portion 104 displays a first, second, or third image for each secondary unit 2 identified by the secondary unit identifying portion 103.

Note that some or all of the structural elements (101 through 104 and 201 through 204) of the primary unit 1 and the secondary unit 2 in FIG. 4 may be achieved through hardware, such as electronic circuits, or the like.

Examples of Displays for the Display Unit 16 of the Primary Unit 1

Figure 5:
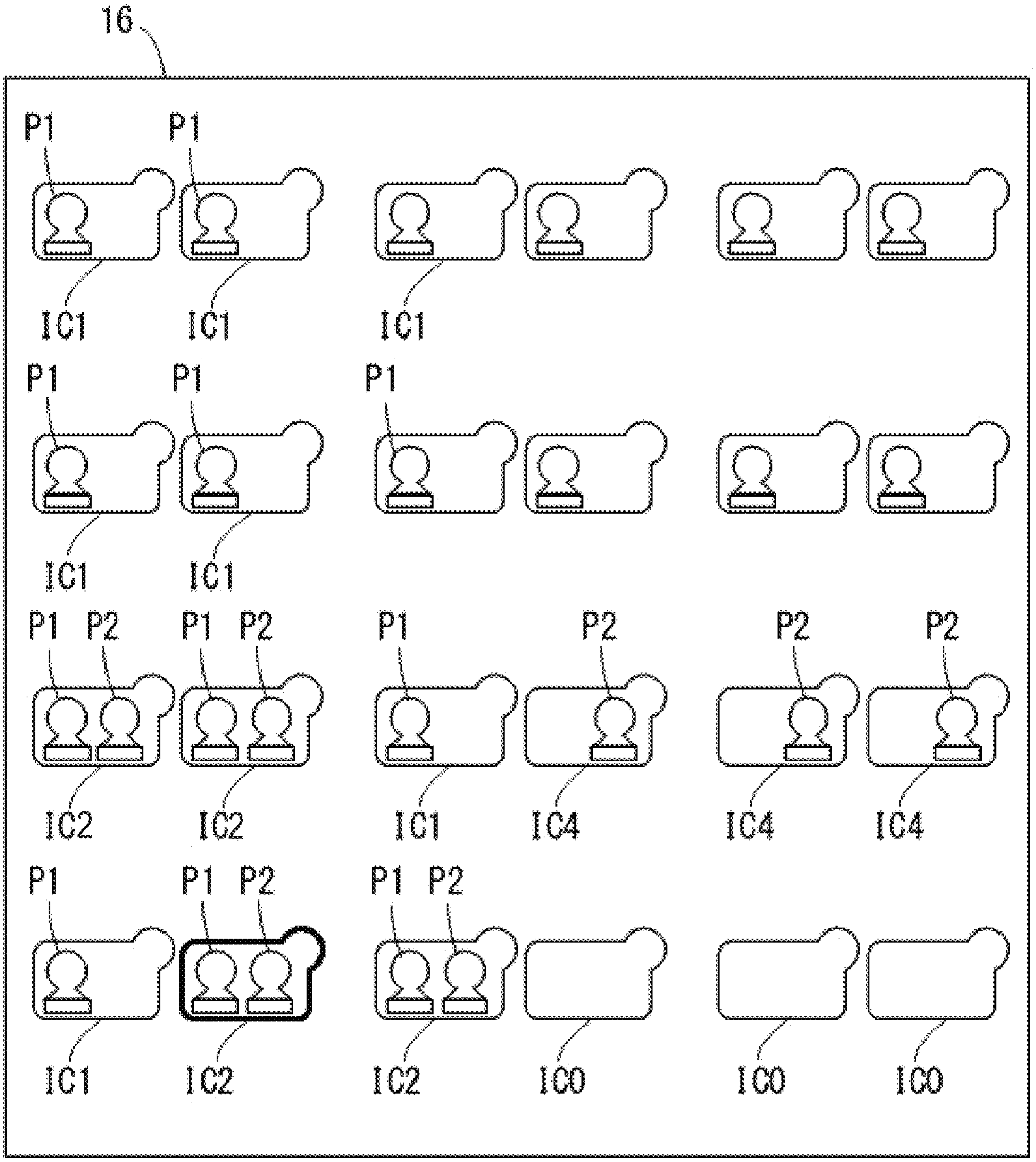
FIG. 5 is a diagram depicting an example display of the display unit of the primary unit.

FIG. 5 is a diagram depicting examples of displays of the display unit 16 of the primary unit 1. A plurality of first, second, and/or third images, corresponding to the plurality of secondary units 2, is displayed on the screen of the display unit 16. In the present embodiment, a solo icon IC1 is displayed as the first image and a duo icon IC2 is displayed as the second image. A secondary unit not-used icon IC0 is displayed as the third image. A single-person image P1 is included in the solo icon IC1. A two-person image P1 and P2 is included in the duo icon IC2. Each solo icon IC1 indicates that the electronic musical instrument 4 that is connected to that secondary unit 2 is set to solo mode, through connection of a headset 50 to the primary terminal 31 of the secondary unit 2. Each duo icon IC2 indicates that the electronic musical instrument 4 connected to that secondary unit 2 is set to the duo mode through connection of headsets 50 to the primary terminal 31 and the secondary terminal 32 of the secondary unit 2. The secondary unit not-used icon IC0 indicates that the electronic musical instrument 4 that is connected to the secondary unit 2 is not being used for performance instruction. The user of each secondary unit 2 is able to input his or her own name, through operating the operating panel 21. The name that has been inputted is transmitted to the primary unit 1. The frame around the solo icon IC1 or duo icon IC2 corresponding to the secondary unit 2 that is communicating with the primary unit 1 is displayed with emphasis through a heavier line. In the example in FIG. 5 it can be seen that the secondary unit 2 corresponding to the duo icon IC2 that is the fourth from the top and the second from the left is currently communicating. Note that a solo icon IC4 may be displayed as a fourth image. The solo icon IC4 includes a single-person image P2. Each solo icon IC4 indicates that the electronic musical instrument 4 that is connected to that secondary unit 2 is set to the solo mode through connection of a headset 50 to the secondary terminal 32 of the secondary unit 2.

Figure 6:
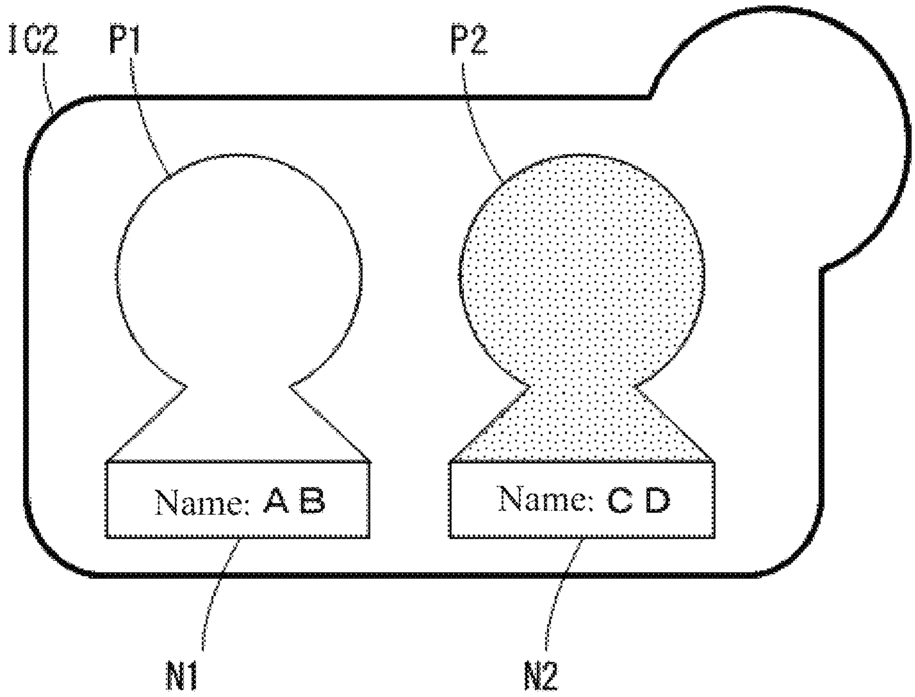
FIG. 6 is an enlarged view of a duo icon.

FIG. 6 is an enlarged view of a duo icon IC2. The names N1 and N2 of the performers are displayed under the two person images P1 and P2, in the duo icon IC2. Through this, the teacher who is using the primary unit 1 is able to discern easily that the electronic musical instrument 4 that is connected to the secondary unit 2 is set to duo mode, and discern easily the names of the two performers on the electronic musical instrument 4 that is connected to the secondary unit 2. Note that the name of the performer may be displayed under the person image P1 of the solo icon IC1, and the name of the performer may be displayed under the person image P2 of the solo icon IC4.

When the performance data through performing on the left key region or the right key region, or voice data from one of the headsets 50, is sent from the secondary unit 2 to the primary unit 1, the person image P2 corresponding to the source that produced the performance data or voice data, based on the identification information, is displayed, on the display unit 16, in a form that is different from that of the other person image P1. For example, the person image P2 corresponding to the source that produced the performance data or the voice data may be displayed in a color that is different from that of the other person image P1, or may be displayed as flashing. The person image P2 corresponding to the source that produced the performance data or the voice data may be displayed so as to have a different shape from that of the other person image P1. Here the production source corresponds to either the left key region or the right key region, or to either the primary terminal 31 or the secondary terminal 32, or to the headset 50 for the left performer or the headset 50 for the right performer.

When performance data from the left key region and the right key region, or voice data from both headsets 50, are sent from the secondary unit 2 to the primary unit 1, the person images P1 and P2 corresponding to the source of the performance data or voice data are displayed on the display unit 16 in a form that is different from that when no performance data or voice data is being sent.

Example of a Performance Mode Setting Method

Figure 7:
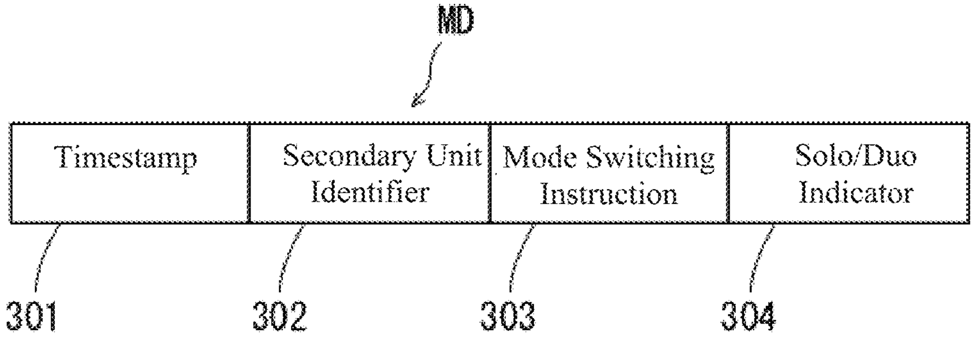
FIG. 7 is a schematic diagram depicting an example of performance mode information data.
Figure 8:
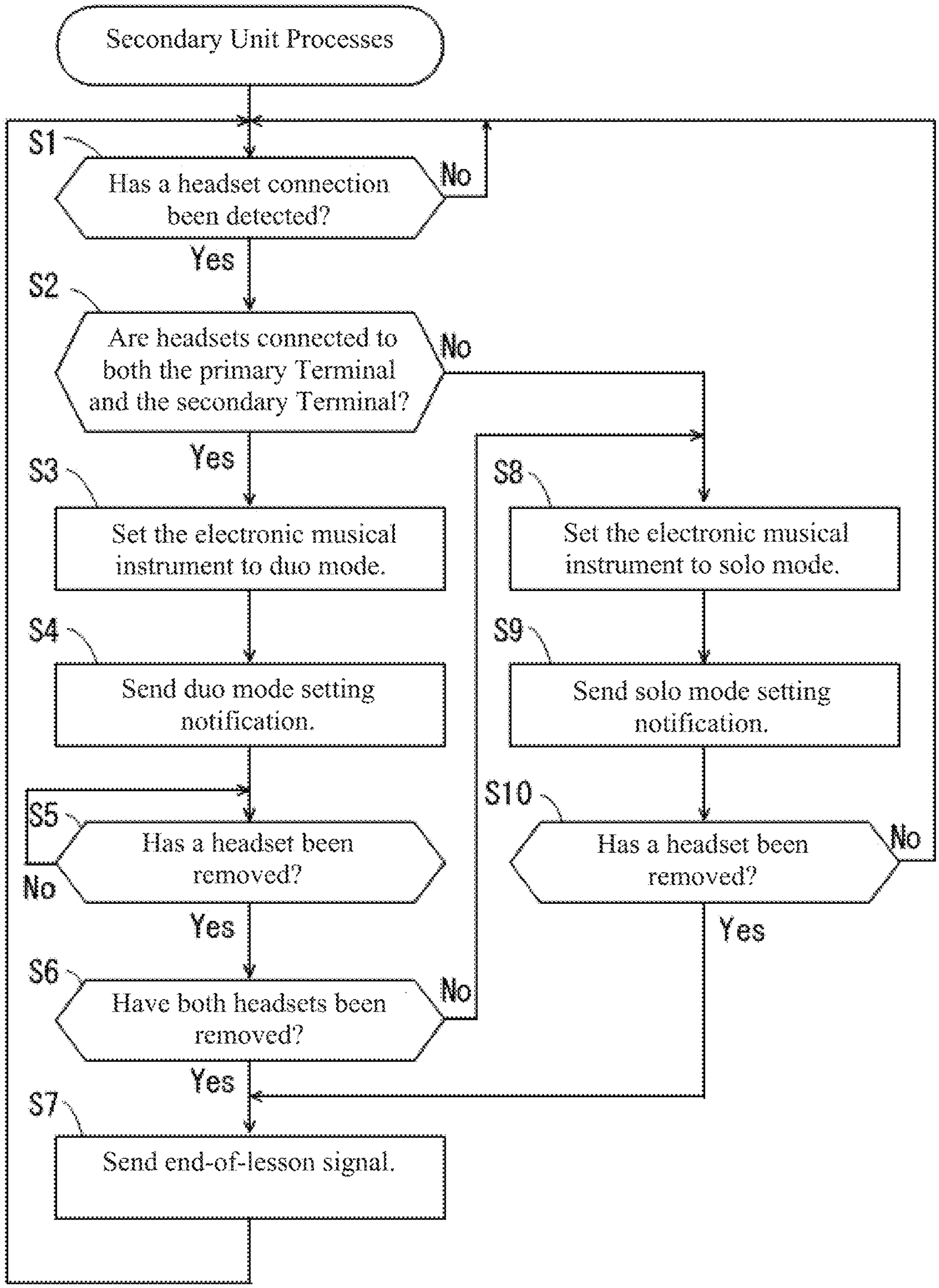
FIG. 8 is a flowchart depicting processes in a secondary unit.
Figure 9:
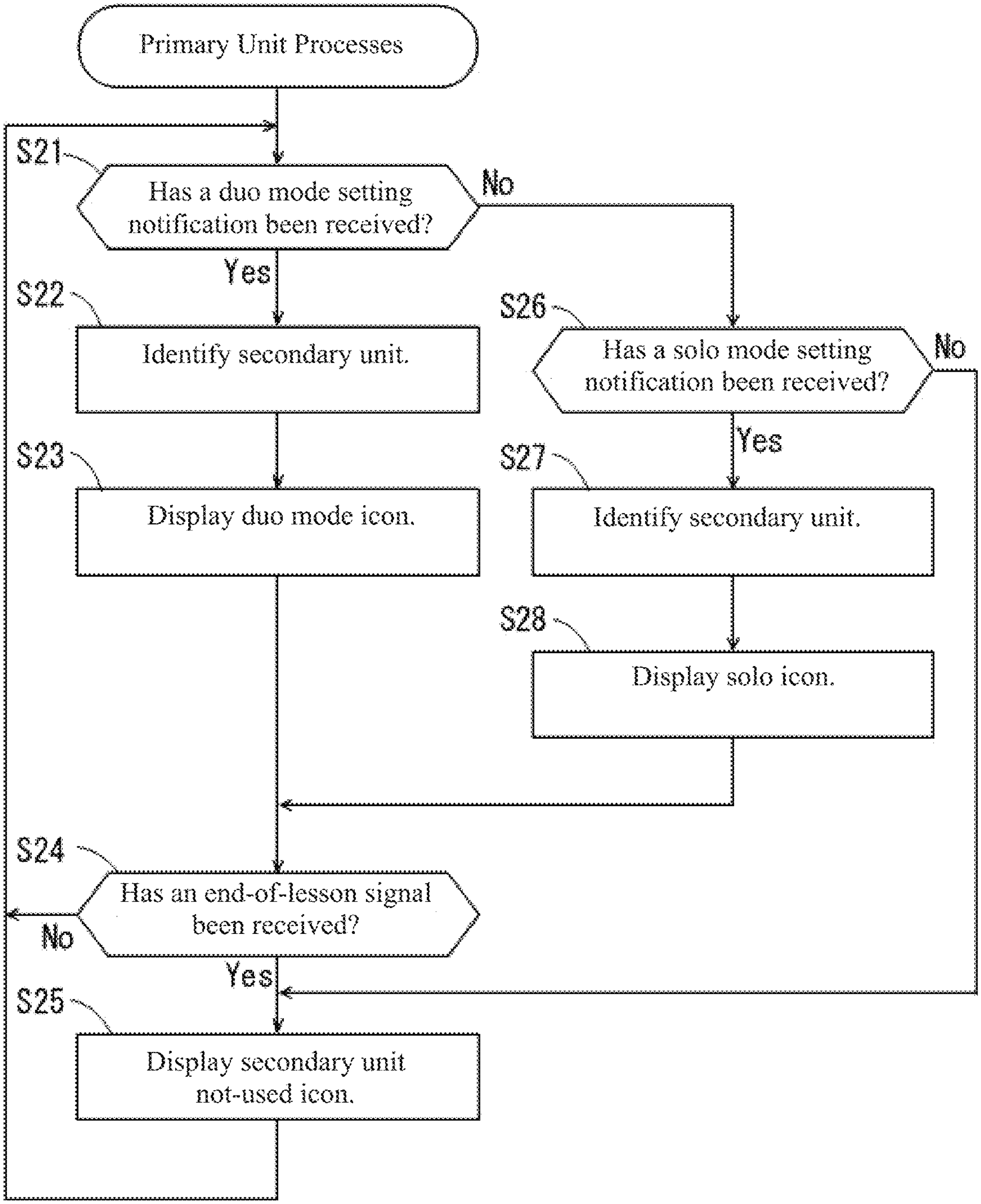
FIG. 9 is a flowchart depicting processes in the primary unit.

The performance mode setting method by the primary unit 1 and the secondary units 2 is explained next. The performance mode setting method includes processes by the secondary unit 2 and processes by the primary unit 1. FIG. 7 is a schematic diagram depicting an example of performance mode notification data. FIG. 8 is a flowchart depicting the processes of the secondary unit 2. FIG. 9 is a flowchart depicting the processes of the primary unit 1. The processes in FIG. 8 are carried out through the CPU 22 in FIG. 2 executing the performance mode setting program that is stored in the storage device 27 or the ROM 24. The processes in FIG. 9 are carried out through the CPU 12 in FIG. 2 executing the performance mode setting program that is stored in the storage device 17 or the ROM 14.

The performance mode notification data MD, depicted in FIG. 7, is, for example, a MIDI (Musical Instruments Digital Interface) message. The performance mode notification data MD includes numeric value data indicating a timestamp 301 that indicates the current time, a secondary unit identifier 302, a mode switching instruction 303, and solo/duo indicator 304. If the solo/duo indicator 304 is a numeric value indicating "solo," then the performance mode notification data MD is a solo mode setting notification. If the solo/duo indicator 304 is a numeric value indicating "duo," then the performance mode notification data MD is a duo mode setting notification.

With reference to FIG. 8, the performance mode setting method can include the connection detecting portion 201 of FIG. 4 detecting whether or not there is a headset 50 connected in the primary terminal 31 and/or the secondary terminal 32 (Step S1). If no connection of a headset 50 is detected, the mode determining portion 202 stands by until detection of the connection of a headset 50 by the connection detecting portion 201.

When the connection of a headset 50 is detected, the mode determining portion 102 determines whether or not there are headsets 50 connected to both the primary terminal 31 and the secondary terminal 32 (Step S2). If headsets 50 are connected to both the primary terminal 31 and the secondary terminal 32, the mode setting portion 204 sets the electronic musical instrument 4 to the duo mode (Step S3). The transmitting portion 203 transmits a duo mode setting notification to the primary unit 1 through the communication network 5 (Step S4).

The mode determining portion 102 determines whether or not a headset 50 has been removed from the secondary unit 2 (Step S5). If neither headset 50 has been removed from the secondary unit 2, the mode determining portion 102 stands by. If at least one headset 50 has been removed from the secondary unit 2, the mode determining portion 102 determines whether or not both headsets 50 have been removed from the secondary unit 2 (Step S6). If both headsets 50 have been removed from the secondary unit 2, the transmitting portion 203 transmits an end-of-lesson signal, indicating that the training has ended, to the primary unit 1 through the communication network 5 (Step S7), and processing returns to Step S1.

If, in Step S2, there are not headsets 50 connected to both the primary terminal 31 and the secondary terminal 32 (that is, if there is a headset 50 connected to either the primary terminal 31 and the secondary terminal 32 but no headset 50 connected to the other), the mode determining portion 202 sets the electronic musical instrument 4 to solo mode (Step S8). In the present embodiment, if a headset 50 is connected to only the primary terminal 31, the mode setting portion 204 sets the electronic musical instrument 4 to the solo mode. Note that if the headset 50 is connected to only the secondary terminal 32, the mode setting portion 204 may set the electronic musical instrument 4 to solo mode. The transmitting portion 203 transmits a solo mode setting notification to the primary unit 1 through the communication network 5 (Step S9).

The mode determining portion 202 determines whether or not a headset 50 has been removed from the secondary unit 2 (Step S10). If no headset 50 has been removed from the secondary unit 2, the mode determining portion 202 returns to Step S1. If a headset 50 has been removed from the secondary unit 2, the mode determining portion 202 advances to Step S7, and sends an end-of-lesson signal to the primary unit 1 through the network 5.

If, in Step S6, it is not true that both headsets 50 have been removed from the secondary unit 2 (that is, only one headset 50 has been removed from the secondary unit 2), the mode determining portion 202 advances to Step S8.

In this way, if two headsets 50 are connected to the secondary unit 2, the electronic musical instrument 4 corresponding to that secondary unit 2 is set to duo mode, and a duo mode setting notification is sent from that secondary unit 2 to the primary unit 1. On the other hand, if only a single headset 50 is connected to the secondary unit 2, the electronic musical instrument 4 corresponding to that secondary unit 2 is set to the solo mode, and a solo mode setting notification is sent to the primary unit 1 from that secondary unit 2.

The receiving portion 101 of the primary unit 1 of FIG. 4 receives notification of the performance mode that has been sent from the secondary unit 2. With reference to FIG. 9, the mode determining portion 102 determines whether or not a duo mode setting notification has been received as a performance mode notification by the receiving portion 101 (Step S21). If the receiving portion 101 has received a duo mode setting notification, the secondary unit identifying portion 103 identifies the secondary unit 2 that sent the duo mode setting notification, based on the secondary unit identifier that is included in the duo mode setting notification (Step S22). The display controlling portion 104 displays, on the display unit 16, the duo icon IC2, corresponding to the secondary unit 2 (Step S23).

The mode determining portion 102 determines whether or not the receiving portion 101 has received an end-of-lesson signal (Step S24). When the end-of-lesson signal has been received by the receiving portion 101, the display controlling portion 104 displays, on the display unit 16, a secondary unit not-used icon IC0, corresponding to the secondary unit 2 (Step S25), and processing returns to Step S21.

In Step S21, if the receiving portion 101 has not received a duo mode setting notification, the mode determining portion 102 determines whether or not the receiving portion 101 has received a solo mode setting notification (Step S26). If the receiving portion 101 has received a solo mode setting notification, the secondary unit identifying portion 103 identifies the secondary unit 2 that sent the solo mode setting notification, based on the secondary unit identifier included in the solo mode setting notification (Step S27). The display controlling portion 104 displays, on the display unit 16, a solo icon IC1, corresponding to the secondary unit 2 (Step S28), and processing advances to Step S24.

If, in Step S26, the receiving portion 101 has not received a solo mode setting notification, the mode determining portion 102 advances to Step S25.

In this way, when an electronic musical instrument 4 corresponding to the secondary unit 2 has been set to the duo mode, the duo icon IC2 corresponding to the secondary unit 2 is displayed on the display unit 16 of the primary unit 1. When an electronic musical instrument 4 corresponding to the secondary unit 2 has been set to the solo mode, the solo icon IC1 corresponding to the secondary unit 2 is displayed on the display unit 16 of the primary unit 1. When an electronic musical instrument 4 corresponding to the secondary unit 2 has been set to neither the solo mode nor the duo mode, the secondary unit not-used icon IC0 corresponding to the secondary unit 2 is displayed on the display unit 16 of the primary unit 1.

Note that the sequence of Steps S3 and S4 in FIG. 8 may be reversed, or Step S3 and Step S4 may be carried out simultaneously. Moreover, the sequence of Steps S8 and S9 in FIG. 8 may be reversed, or Step S8 and Step S9 may be carried out simultaneously Effects of the Embodiment In some embodiments, each secondary unit 2 is provided with a corresponding electronic musical instrument 4, and is able to communicate with the primary unit 1. A plurality of students can connect respective headsets 50, which are receivers, to the primary terminals 31 and secondary terminals 32 that are the connecting portions of the secondary units 2. Whether or not a plurality of headsets 50 are connected to a secondary unit 2 is determined by the mode setting portion 204. Upon (e.g., in response to) evaluation that a plurality of headsets 50 are connected to a secondary unit 2, the electronic musical instrument 4 that is connected to that secondary unit 2 is set, by the mode setting portion 204, to the duo mode. Through this, a plurality of students are able to perform using a single electronic musical instrument 4, through connecting a plurality of headsets 50 to the secondary unit 2. Consequently, the performance on the electronic musical instrument 4 by the plurality of students, can be started smoothly.

Additionally, because the duo mode setting notification is sent by the transmitting portion 203 to the primary unit 1, the teacher is able to identify easily that the electronic musical instrument 4 corresponding to the secondary unit 2 has been set to the duo mode.

Additionally, in some embodiments, in the duo mode, the keyboard of the electronic musical instrument 4 is divided into a plurality of key regions (the left key region and the right key region). Through this, a plurality of students can carry out performance simultaneously using their respective key regions.

Furthermore, in some embodiments, the primary unit 1 has a display unit 16 or is able to connect to a display unit 16. In this case, when a duo mode setting notification that is transmitted from the transmitting portion 203 has been received by the receiving portion 101, a display showing the duo mode setting notification is displayed by the display controlling portion 104 on the display unit 16. This makes it possible for the teacher, who has the primary unit 1, to identify visually that the electronic musical instrument 4 corresponding to that secondary unit 2 has been set to duo mode.

Moreover, if, in some embodiments, there is an evaluation by the mode setting portion 204 that a single headset 50, which is a receiver, has been connected to the secondary unit 2, a solo mode setting notification is sent to the primary unit 1 from the transmitting portion 203. When the solo mode setting notification is received by the receiving portion 101, a first image, corresponding to the solo mode, is displayed by the display controlling portion 104 on the display unit 16. Additionally, when the duo mode setting notification is received by the receiving portion 101, a second image, corresponding to the duo mode, is displayed by the display controlling portion 104 on the display unit 16. Through this, the teacher is able to identify visually whether the electronic musical instrument 4 corresponding to the secondary unit 2 has been set to solo mode or set to duo mode.

Moreover, in some embodiments, the first image is a solo icon IC1 that includes a person image P1 that displays a single person, and the second image is a duo icon IC2 that includes person images P1 and P2, indicating two people. Through this, the teacher is able to identify easily, by sight, whether the electronic musical instrument 4 corresponding to the secondary unit 2 has been set to solo mode or set to duo mode.

Furthermore, in some embodiments, if the electronic musical instrument 4 corresponding to the secondary unit 2 has been set to duo mode, the data (voice data or performance data) produced based on actions of each of the plurality of students are transmitted to the primary unit 1, and identifying information indicating the source that produced the data that has been transmitted is sent to the primary unit 1. Through this, the primary unit 1 is able to identify easily the received data as data from the student that is one of the plurality of students performing on the electronic musical instrument 4. Here, the performance by the student refers to performing using a key region corresponding to that student, or a voice into the headset 50 equipped by that student.

Moreover, in some embodiments, the electronic musical instrument 3 is connected to the primary unit 1, enabling performance data that is generated through the teacher performing on the electronic musical instrument 3 to be transmitted to the secondary unit 2. This enables the one or two students who are performing on the electronic musical instrument 4 corresponding to the secondary unit 2 to hear the performance by the teacher, through the headsets 50. Moreover, a teacher's headset (not shown) can be connected to the primary unit 1, enabling instructions or directions in the voice of the teacher, as voice data, to be sent from the primary unit 1 to the secondary unit 2. Through this, the student is able to listen to instructions or directions in the voice of the teacher through the headset 50. Moreover, because the performance data by each of the students is transmitted from the secondary unit 2 to the primary unit 1, the teacher is able to listen to the performances of each of the students using the teacher's headset. Moreover, each of the students can use the headset 50 to ask questions, or the like, via voice, and that voice can be transmitted as voice data to the primary unit 1. Through this, the teacher is able to hear, through the teacher's headset, the voice of the individual students, such as questions, or the like.

Other Embodiments

While, in the embodiments set forth above, one or a plurality of headsets 50 can be connected as one or a plurality of receivers to the secondary unit 2, a different one or plurality of receivers, having at least receiving functions, may be connected instead. For example, one or a plurality of headphones may be connected instead of the one or plurality of headsets 50, or one or a plurality of earphones may be connected, to the secondary unit 2. In this case, it would be through the headphone or earphone that the voice of the teacher or the sound of performance of the electronic musical instrument 3 by the teacher would be output. Moreover, one or a plurality of mobile terminals, or one or a plurality of USB (Universal Serial Bus) devices, may be connected to the secondary unit 2 instead of one or a plurality of headsets 50. In this case, the voice of the teacher, or the sound of the performance on the electronic musical instrument 3 by the teacher, would be output from the mobile terminal or the USB device, or the instructions, or the like, by the teacher would be displayed on a screen of the mobile terminal or a screen of the USB device.

While in embodiments set forth above, the headset 50 was connected directly to the primary terminal 31 or the secondary terminal 32 of the secondary unit 2, receivers, such as one or a plurality of headsets 50, or the like, may be connected to the secondary unit 2 through wireless communication. For example, one or a plurality of Bluetooth® earphones may be connected through pairing to the secondary unit 2.

While in embodiments set forth above, each secondary unit 2 included a mode determining portion of 202, instead a single mode setting portion may be provided for a plurality of secondary units 2 in the performance system. In this case, the mode determining portion would determine the performance mode corresponding to each individual secondary unit 2 based on detection results of the connection detecting portions 201 of the individual secondary units 2. Moreover, the primary unit 1 may include the mode setting portion 204. In this case, the mode determining portion 102 of the primary unit 1 would determine the performance mode corresponding to each individual secondary unit 2 through receiving the detection results of the connection detecting portion 201 of the individual secondary unit 2.

While, in embodiments set forth above, each individual secondary unit 2 included a transmitting portion 203, an individual transmitting portion 203 may be provided for a plurality of secondary units 2 instead in the performance system. In this case, the transmitting portion would transmit the solo mode setting notification or duo mode setting notification to the primary unit 1 based on the evaluation results by the mode setting portions 204 of each of the secondary units 2 or on an evaluation result of a single mode determining portion for a plurality of secondary units 2.

While in embodiments set forth above, a duo mode setting notification was sent to the primary unit 1 if a plurality of headsets 50 were connected to a secondary unit 2 and a solo mode setting notification was sent to the primary unit 1 when only a single headset 50 was connected to the secondary unit 2, the configuration may be such that no solo mode setting notification is transmitted to the primary unit 1 when only a single headset 50 is connected to the secondary unit 2. In this case, insofar as the primary unit 1 does not receive a duo mode setting notification, the secondary unit 2 would be treated as being set to the solo mode.

While, in embodiments set forth above, a second image is displayed on the display unit 16 that corresponds to the primary unit 1 when a plurality of headsets 50 are connected to the secondary unit 2, instead another display may be displayed instead on the display unit 16 corresponding to the primary unit 1 indicating that the secondary unit 2 has been set to the duo mode when a plurality of headsets 50 are connected to the secondary unit 2. For example, it may be another information display such as text, another graphic, or the like, indicating that the secondary unit 2 has been set to the duo mode. Moreover, a lamp may be lit to indicate that the secondary unit 2 has been set to the duo mode, or there may be an audio output indicating that the secondary unit 2 has been set to the duo mode.

While in embodiments set forth above, the primary unit 1 included a display unit 16, the primary unit 1 may be connected to an external display unit instead, rather than the primary unit 1 including a display unit 16. In this case, the primary unit 1 would display the first or second image on the external display unit.

While in embodiments set forth above, the person images P1 and P2 within the solo icon IC1 and duo icon IC2 were shown as simple shapes, photographs of individuals may be displayed instead of the person images P1 and P2 within the solo icon IC1 and duo icon IC2.

While in embodiments set forth above, identifying information input by the performers for identifying the one or two performers performing on the electronic musical instrument 4 that is connected to each individual secondary unit 2 was used, the one or two performers may instead be identified through cameras or sensors disposed in the vicinity of the electronic musical instrument 4.

While in embodiments set forth above, the primary unit 1 and each of the secondary units 2 are connected to respective electronic musical instruments 3 and 4, instead the primary unit 1 and each of the secondary units 2 may be provided within the electronic musical instruments 3 and 4.

While in embodiments set forth above, the primary unit 1 is connected to an electronic musical instrument 3, instead the configuration may be such that no electronic musical instrument 3 is connected to the primary unit 1.

While in embodiments set forth above, the electronic musical instruments 3 and 4 are keyboard musical instruments, the electronic musical instruments 3 and 4 may instead be other electronic musical instruments that can be performed by a plurality of individuals. For example, the electronic musical instruments 3 and 4 may be drum sets instead.

Correspondence of the Various Structural Elements of the Claims with the Various Elements in the Embodiment Examples of the correspondence of the various structural elements in the claims and the various elements in the embodiment are explained below. In embodiments set forth above: the mode determining portion 202 is an example of an "determining portion"; the mode setting portion 204 is an example of a "setting portion"; the primary terminal 31 and the secondary terminal 32 are examples of "connecting portions"; the solo mode is an example of a "first mode"; the duo mode is an example of a "second mode"; the solo icon IC1 is an example of a "first image" or "first icon"; and the duo icon IC2 is an example of a "second image" or "second icon." Various other types of elements having the same structures or functions that are described in the claims may be used for the respective structural elements in the claims.

What is claimed is:

1. A performance system comprising:

a primary unit comprising a first processor configured to execute first computer executable instructions to perform one or more functions; and a secondary unit configured to communicate with the primary unit and be connectable to an electronic musical instrument, the electronic musical instrument configured for operation in at least a first mode that enables performance by a single individual and a second mode that enables performance by a plurality of individuals, the secondary unit comprising:

a connecting portion configured to connect to a plurality of receivers, each receiver of the plurality of receivers having at least a receiving function; and a second processor configured to execute second computer executable instructions to perform a plurality of functions including:

determining whether the plurality of receivers is connected to the connecting portion;

transmitting, to the primary unit, a notification that the second mode has been set, upon a determination that the plurality of the receivers is connected to the connecting portion; and setting the electronic musical instrument to the second mode upon the determination that the plurality of receivers is connected to the connecting portion.

2. The performance system as set forth in claim 1, wherein the electronic musical instrument is a keyboard musical instrument that has a keyboard, and wherein the secondary unit is configured to set the keyboard musical instrument to the second mode, which divides the keyboard into a plurality of key regions corresponding to a plurality of individuals.

3. The performance system as set forth in claim 1, wherein the primary unit has a display unit or can be connected to a display unit, and wherein the one or more functions of the first computer executable instructions executed by the first processor of the primary unit include:

receiving the notification, transmitted by the secondary unit, that the second mode has been set; and displaying, on the display unit, a display indicating the second mode has been set, upon receipt by the primary unit of the notification that the second mode has been set.

4. The performance system as set forth in claim 3, wherein the secondary unit is configured to transmit to the primary unit, upon a determination by the secondary unit that only one receiver of the plurality of receivers is connected to the connecting portion, a notification that the first mode has been set, and wherein the primary unit is configured to display on the display unit, upon the receipt of the notification that the first mode has been set, a first image that corresponds to the first mode, and, upon the receipt of the notification that the second mode has been set, a second image corresponding to the second mode.

5. The performance system as set forth in claim 4, wherein the first image includes a first icon representing a single individual, and the second image includes a second icon indicating a plurality of individuals.

6. The performance system as set forth in claim 4, wherein the primary unit is configured to communicate with a plurality of the secondary units, and wherein the primary unit is configured to display, on the display unit, the first image or the second image in correspondence with the plurality of secondary units.

7. The performance system as set forth in claim 1, wherein the secondary unit is configured to transmit to the primary unit, when the second mode is set, data that is produced based on the performance of each of a plurality of individuals, and also transmit to the primary unit, identifying information that identifies a source that produced the data.

8. A performance mode setting method that is achieved through a computer, comprising:

determining whether a plurality of receivers, each receiver of the plurality of receivers having at least a receiving function, is connected to a secondary unit that is in communication with an electronic musical instrument that is configured to be set to a first mode corresponding to performance by a single individual and a second mode corresponding to performance by a plurality of individuals;

setting the electronic musical instrument to the second mode upon a determination that the plurality of receivers is connected to the secondary unit; and transmitting, from the secondary unit to a primary unit, a notification that the second mode has been set, upon the determination that the plurality of the receivers is connected to the secondary unit.

9. The mode setting method as set forth in claim 8, wherein the electronic musical instrument is a keyboard musical instrument that has a keyboard, and wherein setting the electronic musical instrument to the second mode includes dividing the keyboard into a plurality of key regions corresponding to a plurality of individuals.

10. The mode setting method as set forth in claim 8, further comprising:

receiving, by the primary unit, the notification, transmitted from the secondary unit, that the second mode has been set; and displaying, on a display unit of the primary unit or connected to the primary unit, a display indicating the second mode, upon receipt of the notification that the second mode has been set.

11. The mode setting method as set forth in claim 8, further comprising:

transmitting, from the secondary unit to the primary unit, a notification that the first mode has been set, upon a determination that only a single receiver is connected to the secondary unit;

displaying on a display unit of the primary unit or connected to the primary unit, a first image that corresponds to the first mode upon receipt, by the primary unit, of the notification that the first mode has been set; and displaying on the display unit, a second image corresponding to the second mode upon receipt, by the primary unit, of the notification that the second mode has been set.

12. The mode setting method as set forth in claim 11, wherein the first image includes a first icon representing a single individual, and the second image includes a second icon indicating a plurality of individuals.

13. The mode setting method as set forth in claim 11, further comprising displaying, on the display unit, the first image or the second image corresponding to a plurality of secondary units.

14. The performance mode setting method as set forth in claim 8, further comprising:

transmitting to the primary unit, when the second mode is set, data that is produced based on actions of each of a plurality of individuals; and transmitting to the primary unit, when the second mode is set, identifying information for identifying a source that produced the data.

15. A mode setting device, comprising:

a connecting portion, configured to connect to one receiver or a plurality of receivers, each receiver of the one receiver or the plurality of receivers having at least a receiving function, provided in an electronic musical instrument that can be set to a first mode that enables performance of the electronic musical instrument by a single individual and a second mode that enables performance of the electronic musical instrument by a plurality of individuals;

a processor configured to execute computer-executable instructions that cause the mode setting device to perform a plurality of functions including:

determining whether the plurality of the receivers is connected to the connecting portion;

setting the electronic musical instrument to the second mode upon a determination that the plurality of receivers is connected to the connecting portion; and transmitting a notification that the electronic musical instrument has been set to the second mode to an external device that monitors the performance of the electronic musical instrument.

* * * * *